(12) United States Patent
Johnson

(10) Patent No.: US 12,007,269 B2
(45) Date of Patent: Jun. 11, 2024

(54) WEIGHT MEASURING SHOVEL

(71) Applicant: Jeffrey Johnson, Minnetonka, MN (US)

(72) Inventor: Jeffrey Johnson, Minnetonka, MN (US)

( * ) Notice: Subject to any disclaimer, the term of this patent is extended or adjusted under 35 U.S.C. 154(b) by 454 days.

(21) Appl. No.: 17/387,038

(22) Filed: Jul. 28, 2021

(65) Prior Publication Data

US 2022/0268621 A1    Aug. 25, 2022

Related U.S. Application Data

(63) Continuation-in-part of application No. 17/180,861, filed on Feb. 21, 2021, now abandoned.

(51) Int. Cl.

| | |
|---|---|
| *G01G 19/56* | (2006.01) |
| *A01B 1/02* | (2006.01) |
| *B25G 1/04* | (2006.01) |
| *E01H 5/02* | (2006.01) |
| *G01G 19/414* | (2006.01) |
| *G01G 23/00* | (2006.01) |
| *G01G 23/36* | (2006.01) |
| *G01G 23/37* | (2006.01) |
| *G08B 7/06* | (2006.01) |
| *G08B 21/02* | (2006.01) |

(52) U.S. Cl.
CPC ............ *G01G 19/56* (2013.01); *A01B 1/022* (2013.01); *B25G 1/04* (2013.01); *E01H 5/02* (2013.01); *G01G 19/414* (2013.01); *G01G 23/007* (2013.01); *G01G 23/361* (2013.01); *G01G 23/3728* (2013.01); *G08B 7/06* (2013.01); *G08B 21/02* (2013.01)

(58) Field of Classification Search
CPC .... G01G 19/56; G01G 19/414; G01G 23/007; G01G 23/361; G01G 23/3728; A01B 1/022; B25G 1/04; B25G 1/102; E01H 5/02; G08B 7/06; G08B 21/02
USPC .......................................... 177/25.14
See application file for complete search history.

(56) References Cited

U.S. PATENT DOCUMENTS

| | | | | | |
|---|---|---|---|---|---|
| 4,550,943 | A | * | 11/1985 | Mirto | ........................ E01H 5/02 294/50.8 |
| 4,691,954 | A | * | 9/1987 | Shaud | ........................ E01H 5/02 294/54.5 |
| 5,533,768 | A | * | 7/1996 | Mitchell | .................. B25G 1/01 294/54.5 |

(Continued)

*Primary Examiner* — Jacques M Saint Surin
(74) *Attorney, Agent, or Firm* — Jose W. Jimenez; JIMENEZ LAW FIRM

(57) ABSTRACT

Described herein is a weight or pressure measuring shovel. The shoveling apparatus has a broad blade assembly or scoop assembly including an elongate handle member. A coupler assembly is designed to couple the curved plate assembly to allow angular orientation or movement of the curved plate assembly to be adjusted relative to the handle member. A force transducer converts the weight or pressure of a material on the curved plate assembly into an electrical signal designed to communicate the weight or pressure of a material such as snow, sand, dirt, or ice. A control module in a housing mounted on the elongate handle is designed to receive electrical signals from the force transducer assembly or a load cell assembly. A display assembly is coupled to the electrical scale assembly and control module.

20 Claims, 6 Drawing Sheets

(56) References Cited

U.S. PATENT DOCUMENTS

| | | | | |
|---|---|---|---|---|
| 5,975,602 A * | 11/1999 | Zan | ............ | B25G 1/102 |
| | | | | 294/58 |
| 6,922,920 B1 * | 8/2005 | Stratz | ............ | E01H 5/02 |
| | | | | 294/181 |
| 8,515,627 B2 * | 8/2013 | Marathe | ............ | E02F 3/431 |
| | | | | 701/50 |
| 10,941,533 B2 * | 3/2021 | French | ............ | E01H 5/02 |

* cited by examiner

WEIGHT MEASURING SHOVEL

CLAIM OF PRIORITY

This application claims priority to and the benefit of U.S. provisional application with Ser. No. 62/982,760, filed on Feb. 28, 2020, and claims priority to and is continuation in part of U.S. Utility application with Ser. No. 17/180,861, filed on Feb. 21, 2021, both applications entitled "Weight Measuring Shovel", which are hereby incorporated by reference in their entireties.

FIELD OF THE INVENTION

The inventive concept relates generally to shovels for improved ergonomic and injury preventing uses.

BACKGROUND

Currently, there are a number of solutions for preventing back injuries while shoveling snow, sand, dirt, or other materials. One of these solutions attempts to utilize a snowblower, but this solution fails to meet the needs of the market because it is heavy, expensive and cumbersome to use. Another solution is to utilize a powered shovel such as a tractor, but this solution also fails to meet the needs of the market because it requires a great deal of physical exertion to move snow or dirt and the user is not aware of the level of physical exertion that is continually taking place. Still another solution seeks to utilize a back-stabilizing brace while shoveling, but this solution also fails to meet market needs because it is often uncomfortable and may still lead to overexertion by the user. Therefore, there currently exists a need in the market for a shovel apparatus that helps prevents injury or prevent the eventual overexertion by a user when lifting snow, sand, dirt, or other substances, which can potentially lead to a severe cardiac injury or event.

SUMMARY OF THE INVENTION

The inventive concept relates generally to a weight measuring or pressure gauging shovel device. As discussed above, snow shoveling can be dangerous for out of shape or older persons. Over 11,500 Americans are hospitalized each year from a snow shoveling injury as snow shoveling puts strain on the heart and back leading to the possibility of a heart attack or a painful back injury. The inventive shoveling apparatus helps to keep safety first and foremost for the user while shoveling. The shoveling device is able to track weight of loads of snow, dirt, mulch, rock or other substances and is able to set weight limits with a warning alert, such as a MAX Weight Limit=20 lbs.

In one example embodiment,

In another example embodiment, the inventive concept includes a shoveling apparatus with a broad blade assembly or scoop assembly comprising an elongate handle member having a proximal end and a distal end. A curved plate assembly is coupled to the distal end of the elongate handle member, the curved plate assembly having a distal edge portion designed to collect a substance such as snow, sand, or dirt from a surface and a proximal connecting member. A coupler assembly is designed to couple the curved plate assembly to the distal end of the handle member wherein the coupler assembly is designed to allow angular orientation or movement of the curved plate assembly to be adjusted relative to the handle member. A force transducer assembly is coupled to the curled bucket assembly designed to convert the weight or pressure of a material on the curved plate assembly into an electrical signal designed to be received by an electronic module representing an electrical scale assembly. The electrical signal designed to be received by the electronic module representing the electrical scale assembly is coupled to the handle member configured to receive electrical signals from the force transducer assembly. A display assembly is coupled to the electrical scale assembly and module.

The curved plate assembly may include a curled bucket assembly that is curled horizontally to be moved along a surface for collecting material. The display assembly may include a digital graphic user interface. A horizontal handhold may be coupled to the proximal end of the handle member. The force transducer assembly may be protected from moisture by an electrically conducting guard circuit.

Those of ordinary skill in the art would recognize that the inventive concept would be useful for shoveling or pushing aside snow, sand, dirt, or other loose material or material that could be made loose, such as ice, by the inventive concept. Those of ordinary skill in the art would recognize that the inventive concept informs a user of the inventive concept that a certain amount of weight or pressure has been reached, exceeded, or may, within a threshold deemed useful for a warning, have almost been reached. Those of ordinary skill in the art would recognize that the inventive concept could utilize other means to communicate weight or pressure such as periodic or continuous audio signals, periodic or continuous light sources, or vibrations. Those of ordinary skill in the art would recognize that a user may have some controls such as varying the amount of weight or pressure that would generate a signal since people would have differing abilities to handle weight or pressure. Those of ordinary skill in the art would recognize that buttons used to control the graphic user interface element are one embodiment but that the digital graphic user interface element could be a touch screen, could be voice-activated, or could use a dial, knob, switch, or slider.

Those of ordinary skill in the art would recognize that the force transducer and the display require a power source such as a rechargeable or replaceable battery. Those of ordinary skill in the art would recognize that the power source could have a button, a switch, or other assembly to activate the power source. Those of ordinary skill in the art would recognize that the inventive concept, which may be used in damp environments, could benefit from protecting the force transducer assembly with an electrically conducting guard circuit.

It would be advantageous to have an apparatus that is handheld, easily portable and is reusable and requires very little maintenance. Still further, it would be advantageous to have an apparatus that is digital and includes wireless components to easily communicate data to another remote device, such as a smartphone, portable tablet or a notebook PC. In a maintenance scenario, the shovel device is GPS trackable (for security purposes) and is capable of logging time used and effort exerted to avoid injury by users and to keep worker claims to a minimum. In a digital mode, the shovel device can also be used as an exercise device to log calories burned by user to simulate the benefits of a rowing machine or a stationary bicycle. As the user progresses through the shoveling task, the digital module and display of the shovel can provide a display of various measurement parameters and can also provide a visual and audio alarm should a user be overexerting themselves and can signal periods of rest to the user. Similar to an elliptical machine, the shovel device handle can include touch sensors to sense heartrate of the user as another datapoint for exercise or health safety.

The inventive concept advantageously fills the aforementioned deficiencies by providing a pressure, weight, or pressure and weight measuring shovel, which provides a way for users to prevent injuring themselves while shoveling. Alternatively, the shovel device can be used as an exercise tool for the user as part of an overall program to stay active in and around the home as motion (such as pedometer) is logged and correlated to calories burned.

Among other things, it is an advantage of the inventive concept to provide a weight or pressure measuring shovel that does not suffer from problems or deficiencies associated with prior solutions. Still further, the apparatus has weight or pressure warning systems.

The inventive concept now will be described more fully hereinafter with reference to the accompanying drawings, which are intended to be read in conjunction with both this summary, the detailed description and any preferred and/or particular embodiments specifically discussed or otherwise disclosed. This inventive concept may, however, be embodied in many different forms and should not be construed as limited to the embodiments set forth herein; rather, these embodiments are provided by way of illustration only and so that this disclosure will be thorough, complete, and will fully convey the full scope of the inventive concept to those skilled in the art.

DETAILED DESCRIPTION OF THE INVENTION

Following are more detailed descriptions of various related concepts related to, and embodiments of, methods and apparatus according to the present disclosure. It should be appreciated that various aspects of the subject matter introduced above and discussed in greater detail below may be implemented in any of numerous ways, as the subject matter is not limited to any particular manner of implementation. Examples of specific implementations and applications are provided primarily for illustrative purposes.

The various embodiments of the inventive concept include a weight or pressure measuring shovel apparatus and system for gauging user overexertion by a user or alternatively calories burned and repetitive motions counted when used as part of a fitness program.

Figure 1:
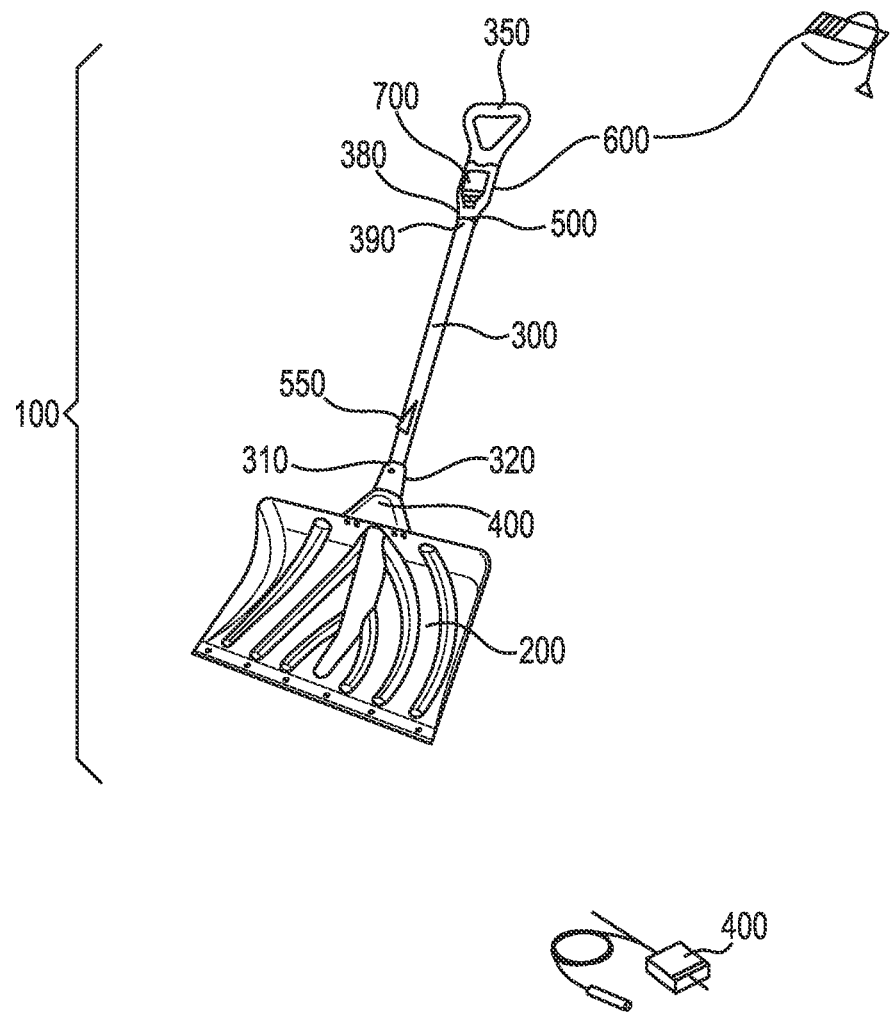
FIG. 1 illustrates a perspective view of the inventive concept of a shoveling apparatus.

Referring to the figures, FIG. 1 illustrates the inventive concept is a shoveling apparatus 100 which includes a curved plate assembly 200 comprising an elongate handle or shaft member 300 having a proximal end 310 and a distal end 390. The curved plate assembly 200 is coupled to the distal end 390 of the elongate handle member 300 and the proximal connecting member 310. A coupler assembly 320 is designed to couple the curved plate assembly 200 to the distal end 390 of the handle member 300 wherein the coupler assembly 320 is designed to allow angular orientation or movement of the curved plate assembly 200 to be adjusted relative to the handle member 300.

In this example embodiment, a force transducer assembly 400 is coupled to the curled bucket assembly 200 designed to convert the weight or pressure from snow, sand, dirt, or other material on or against the curved plate assembly 200 into an electrical signal 550 designed to be received by an electronic module 500 representing an electrical scale assembly 600. The electronic module 500 representing the electrical scale assembly 600 disposed within a proximal coupler assembly 380 is coupled to the handle member 300 configured to receive electrical signals 550 from the force transducer assembly 400. A display assembly 700 is coupled to the electronic module 500 representing the electrical scale assembly 600. A horizontal handhold or handle 350 is coupled to the proximal end 310 of the handle member 300.

Figure 2:
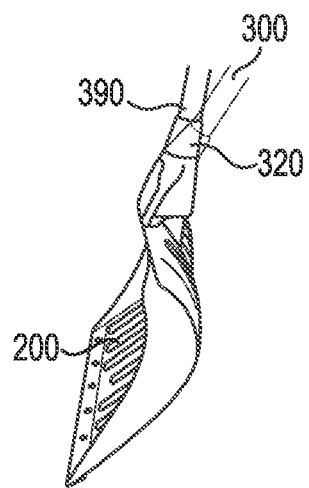
FIG. 2 illustrates a side view of the inventive shoveling apparatus.

FIG. 2 illustrates the coupler assembly 320 designed to couple the curved plate assembly 200 to the distal end 390 of the handle member 300 wherein the coupler assembly 200 is designed to allow angular orientation or movement of the curved plate assembly 200 to be adjusted relative to the handle member 300.

Figure 3:
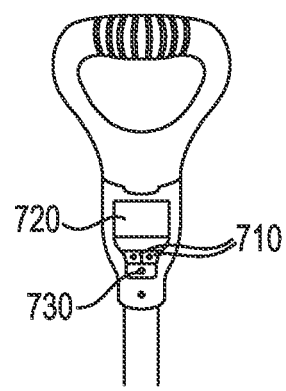
FIG. 3 illustrates a front view of the handle of the inventive shoveling apparatus.

FIG. 3 illustrates a digital graphic user interface 700 with control buttons 710, a display screen 720, and a power button 730. In related embodiments described herein, various features include: 1) the fitness/health tracking ability to monitor number of calories burned and keep track of total weight lifted/moved over a given session and (2) ability to connect via Bluetooth to a mobile device and associated application.

Referring now to FIGS. 4 through 9A and 9B, there is described another example embodiment of a shoveling apparatus 800 having a weight measuring system integrated therein. In this example embodiment, shovel apparatus 800 has an elongate shaft member 810 having a proximal end 812 and a distal end 814 and optionally includes a handle or handhold member 816. A broad blade assembly 820 is coupled to distal end 814 of shaft 810, which includes a load cell assembly 830 for measuring weight of a load placed on broad blade assembly 820. A control module 840 (see FIGS. 9A and 9B) is coupled to proximal end 812 of shaft 810. In this example embodiment, shovel apparatus or assembly 800 includes a rechargeable battery for 2-3 hours of operation and includes a functioning display 850 disposed on a housing 860 which can open in a clamshell configuration with cover 860A and base 860B via hinges 862. Hinges 862 are secured to housing 860 by screws 863. Broad blade assembly 820 along with load cell (weight sensor) assembly 830 allows a load cell member 832 to sense or account for a snow (or other substance) load at a center of mass position of the blade assembly. Weight sensor 830 accurately measures weight (percent difference less than 5% compared to actual weight) and optionally includes a warning alert device (for lifting/scooping function and repetitive motion tracking and alert).

Figure 9B:
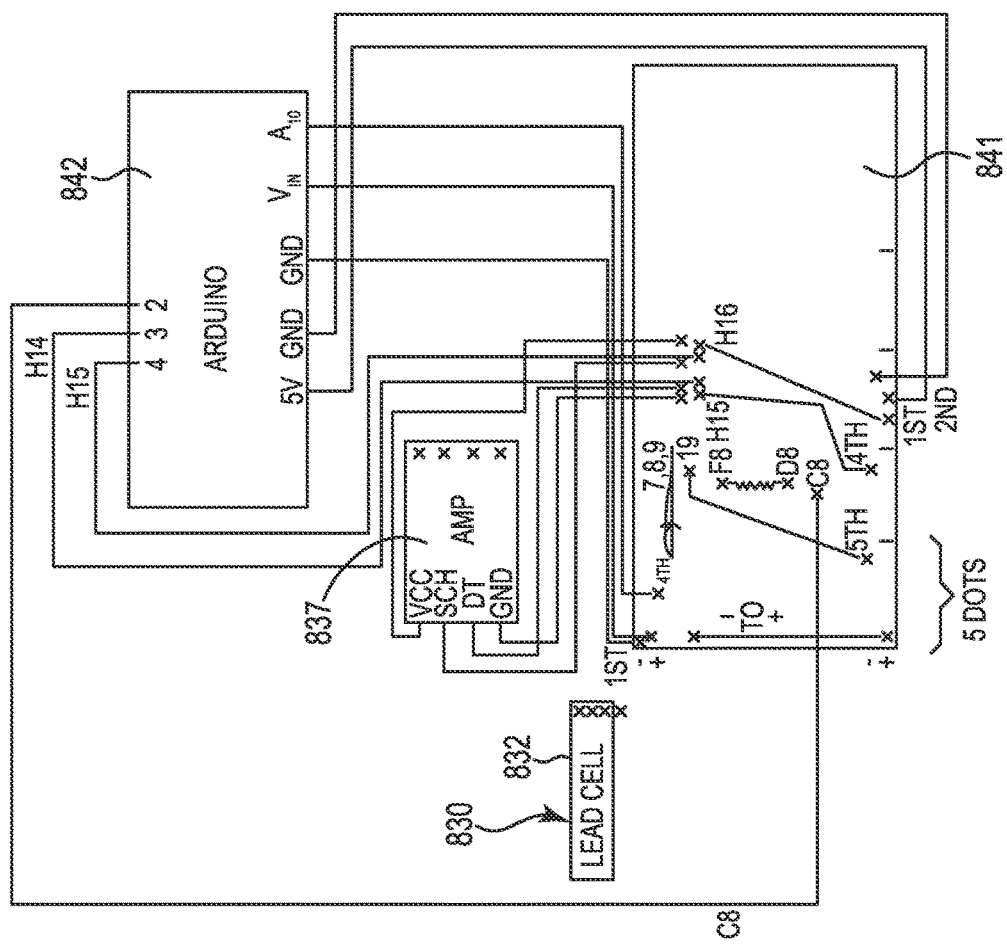
FIGS. 9A and 9B illustrate an Arduino board setup and a circuit diagram, respectively, of a control module of the shovel apparatus weight measuring system.
Figure 9A:
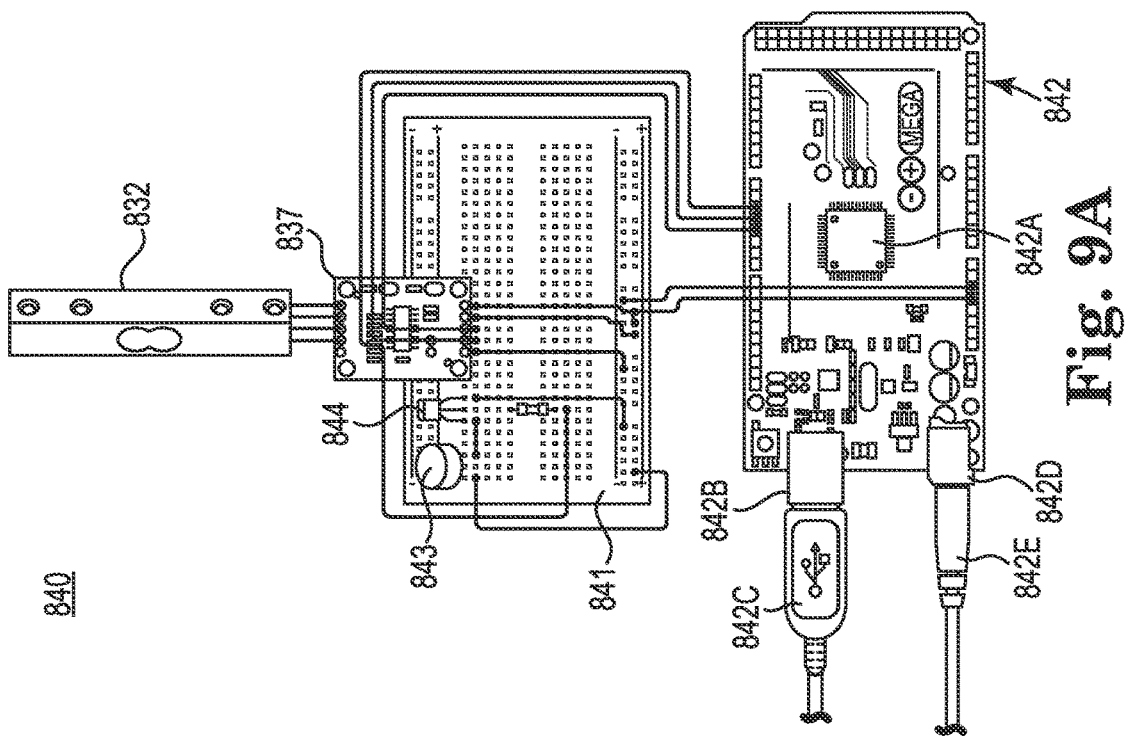

For portability and reduced weight, an aluminum (hollow) shaft is used that provides high strength and stiffness that can withhold a maximum load of about 40 pounds (preferably 20 pounds) for this embodiment. In other embodiments, the shaft is made from wood, plastic, or steel. Other embodiments can be designed to withstand higher lifted load weights. Further, FIGS. 9A and 9B illustrate an Arduino board setup and a circuit diagram, respectively, of a control module 840 of the shovel apparatus weight measuring system housed disposed within housing 860. In this example embodiment, control module 840 furthers a user alarm member (not shown) driven by microcontroller circuit 842, where the user alarm member is selected from the group consisting of an audio alarm element, a haptic signal element and a LED alert element.

Figure 4:
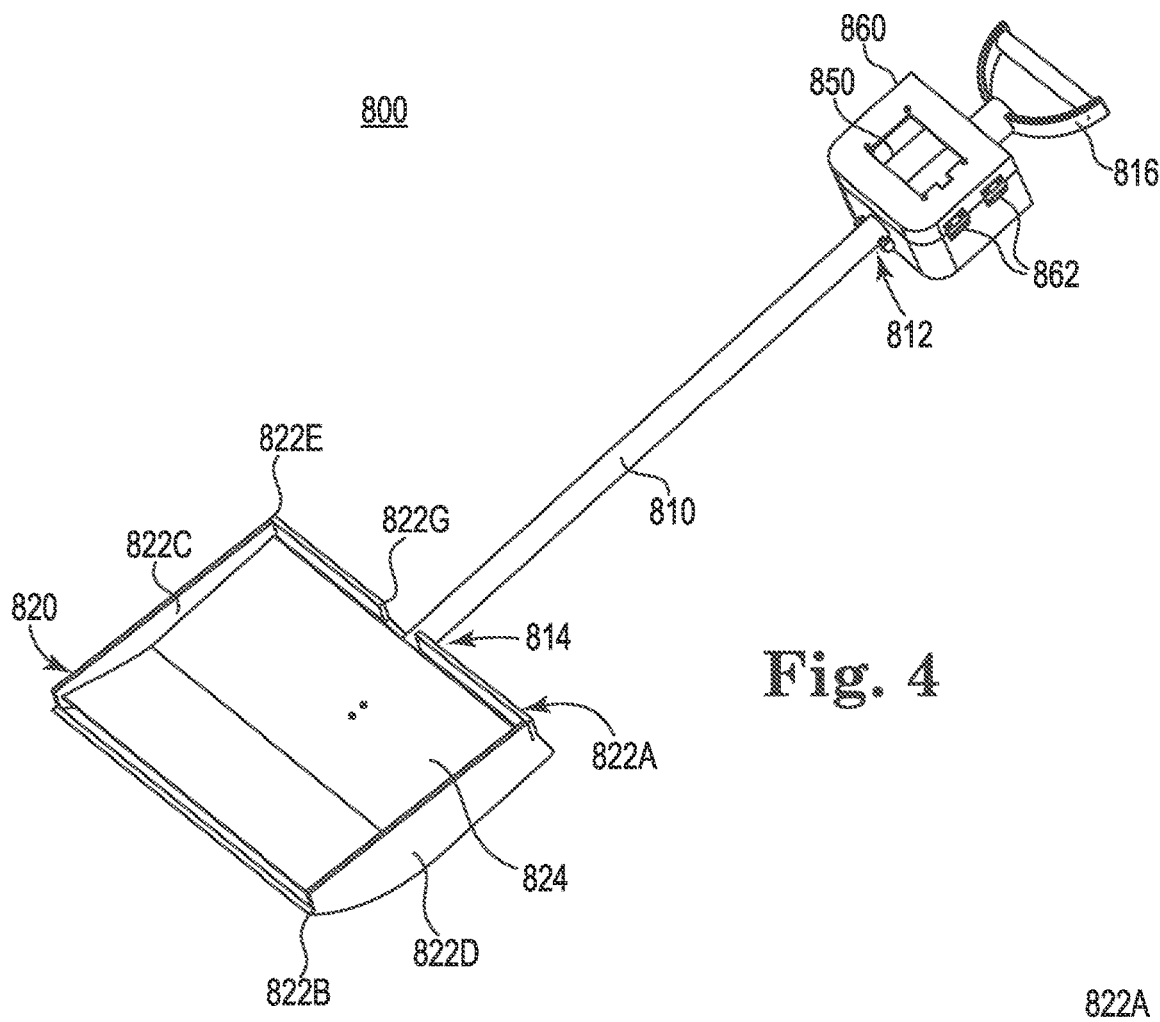
FIG. 4 illustrates a perspective view of another embodiment of the inventive shoveling apparatus.
Figure 5:
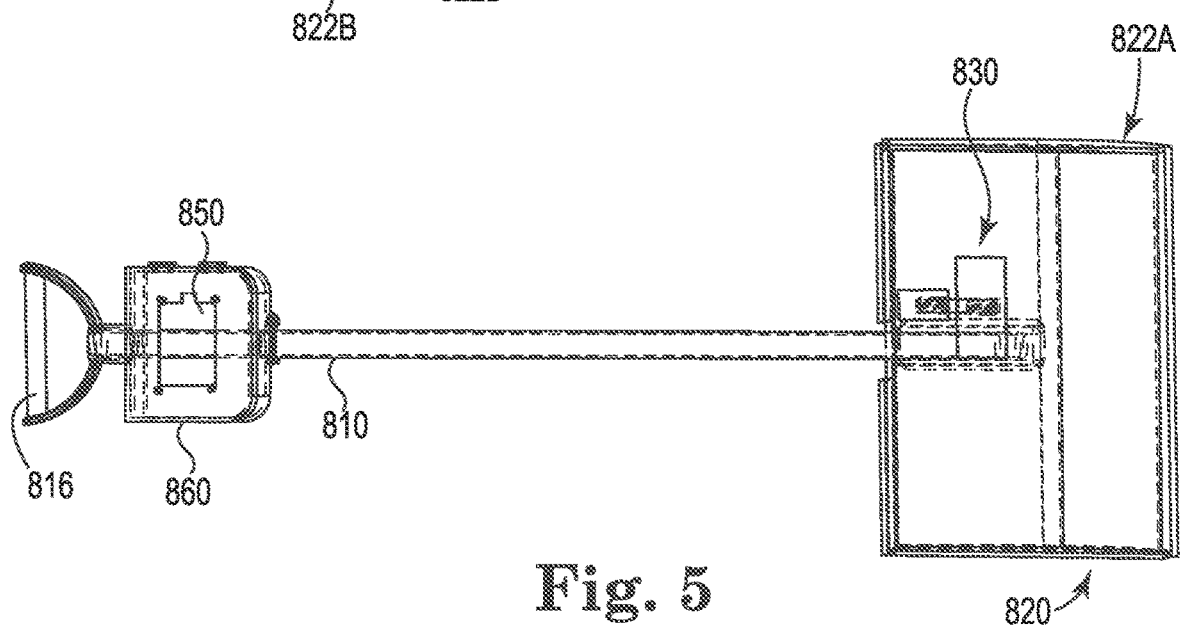
FIG. 5 illustrates a top view of the inventive shoveling apparatus.
Figure 6:
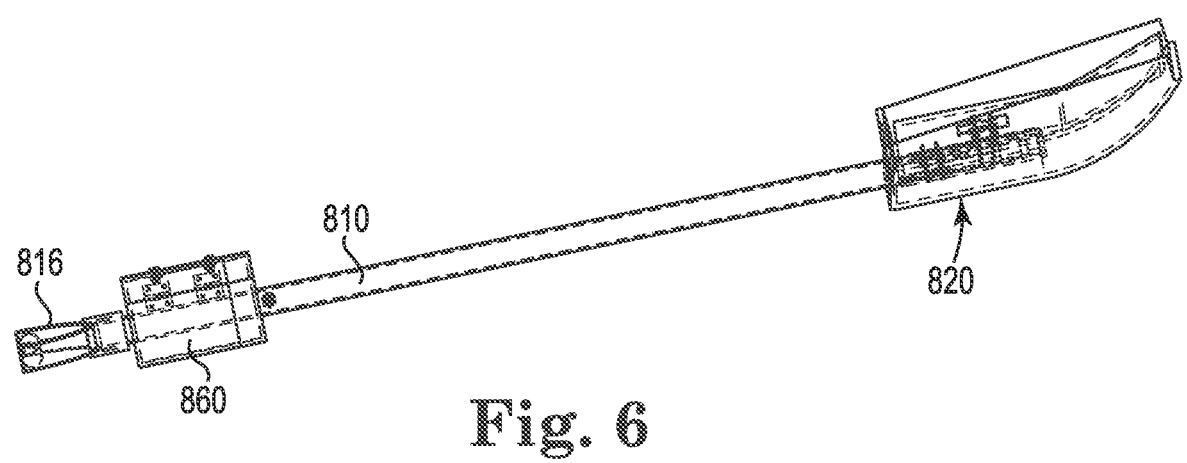
FIG. 6 illustrates a side view of the inventive shoveling apparatus.
Figure 7:
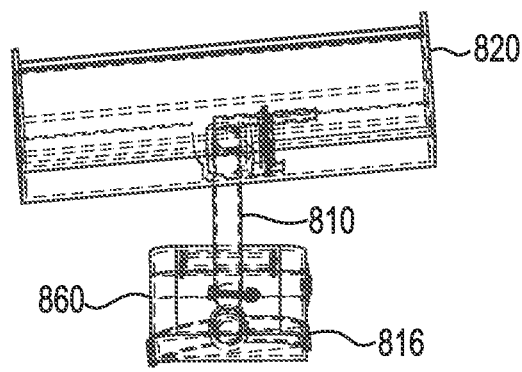
FIG. 7 illustrates an end view from the handle of the inventive shoveling apparatus.
Figure 8:
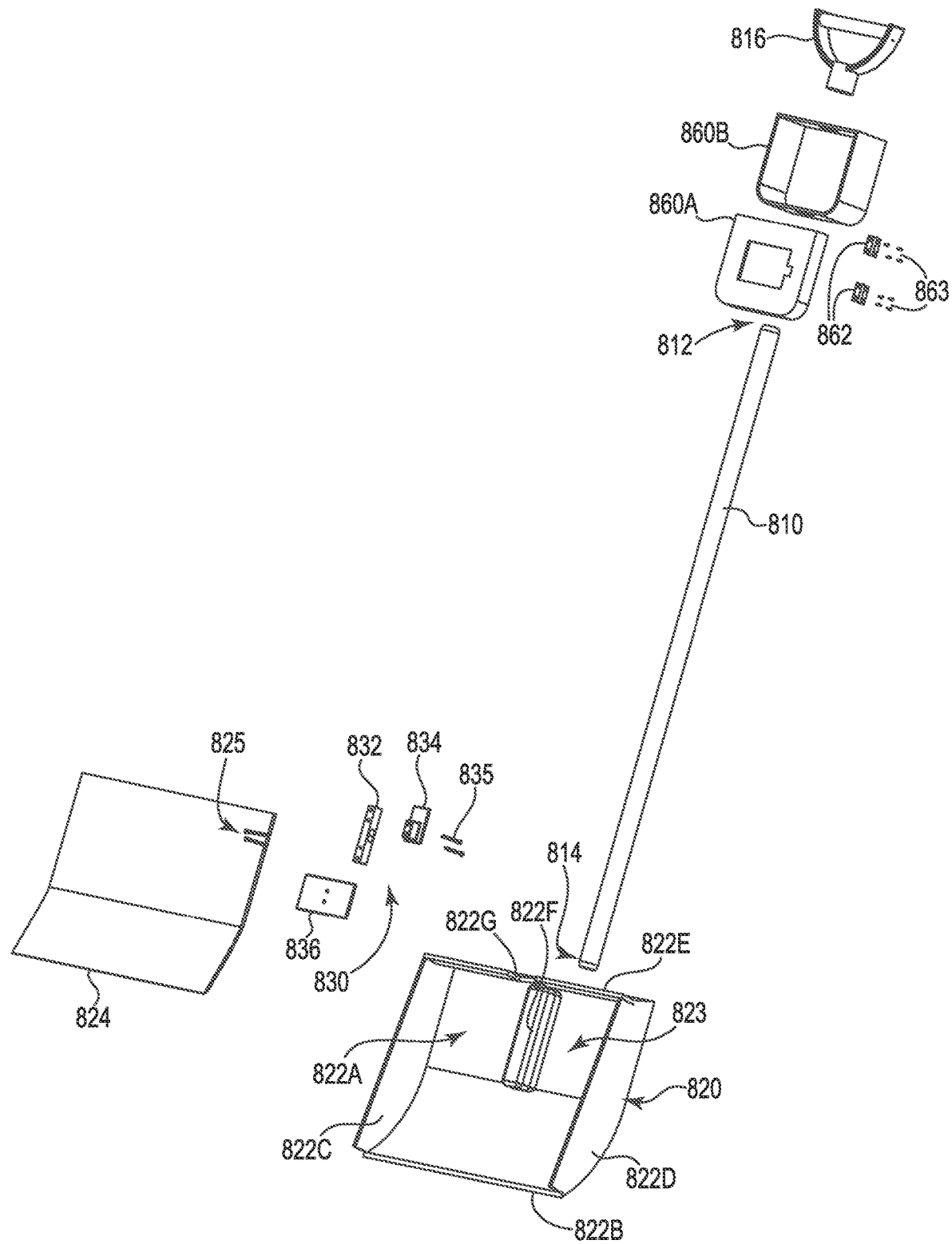
FIG. 8 illustrates an exploded view of the inventive second embodiment of the shoveling apparatus.

In particular, FIG. 4 illustrates a perspective view of shoveling apparatus 800 while FIG. 8 there is illustrated an exploded view of the inventive second embodiment of the shoveling apparatus 800. FIGS. 5-7 illustrate the top, side and end view from a handle 816 of shoveling apparatus 800. In this example embodiment, shovel 800 has a total overall standard length that is about elbow height of 42 inches and includes an adjustable shaft that creates a range from 35 inches to 47.2 inches. Shaft member 810 includes an upper and lower shaft element to facilitate a telescoping configuration (using a twist ring and thread or a button pin joint, for example) that modifies the longitudinal length of the shaft member to accommodate a user In this example embodiment, the blade size of the blade assembly is about 15-25 inches wide.

For ease of description of shoveling apparatus 800, most of the following discussion will be around FIGS. 4, 8 and 9A and 9B. As described above, shovel 800 includes an elongate shaft member 810 having proximal end 812 and distal end 814 having coupled hereon broad blade plate assembly 820 which is what lifts up substance to be shoveled, moved or removed from a surface. Broad blade assembly 820 includes a bottom concave member 822 and a top plate 824 disposed over a bottom concave member 822 to form a cavity 823 therebetween (see FIG. 8). Broad plate assembly 820 includes a curved or concave bottom plate 822A with an distal edge portion 822B bounded by two sidewalls 822C and 822D, respectively, and a backwall 822E having an adjacent shaft connecting portion 822F and a cutout 822G in the backwall to accommodate shaft member 810.

In this example embodiment, and referring to FIGS. 9A and 9B, broad blade plate assembly 820 includes therein a load cell assembly 830 housed in cavity 823 between the top plate 824 and bottom plate 822 and is fastened to bottom plate 822 via screws 835. Load cell assembly 830 has a base 834 coupled to the bottom plate 822, a pressure sensing element or load cell unit 832 in contact with an upper sensor plate 836, upper sensor plate 836 being in contact with the top plate 824. Top plate 824 is fastened with screws 825 to bottom plate 822 and above load cell assembly 830 so as to sense the snow or dirt to be shoveled thereon. Load cell assembly 830 includes an analog to digital converter and amplifier 837 designed to convert a weight or pressure of a material on the top plate 824 of the broad blade assembly into an electrical signal that is transmitted to control module 840. In this example embodiment, a conductive wire is feed through from board plate assembly 820 to control module 840 (see FIGS. 9A and 9B).

In another embodiment, control module 830 receives the signal wirelessly from load cell assembly 830 to eliminate the conductive wire. In this example embodiment, microcontroller circuit includes a transceiver designed to receive radio frequency signals from at least one of the load cell assembly and a smart device. The transceiver is designed to send data to the smart device or an external network. In this example embodiment, the smart device includes a software applet configured to use the generated data received from the microcontroller to provide health and wellness indicators. In this example embodiment, control module 840 and housing 860 is configured to be in a portable configuration or kit.

In this example embodiment and referring further to FIGS. 9A and 9B, control module 840 is disposed on the shaft member 810 within housing 860 and is designed to receive the electrical signal from the load cell assembly 830. Control module 840, in this example embodiment, uses a breadboard 841 to assemble the control circuit which includes microcontroller circuit 842, a display assembly 850 and a power source module coupled to the microcontroller assembly and the display assembly 850, wherein the microcontroller assembly is designed to generate data and display data on the display assembly 850, the data including parameters such as weight of a substance on the broad plate assembly, calories burned by user during shoveling event, accumulated time of the shoveling event and alerts or warnings provided to user of overexertion events. Housing 860, in this example embodiment, holds an LCD display 850, a circuit board 842, a buzzer 843, and an alarm 844. Specifically, housing 860 includes load cell unit 832, an HX711 load cell amplifier 837, an Arduino AT-Mega2560 microcontroller board 842, an KPEG-351 piezoelectric buzzer 843, and a 1500 mAh Li-ion battery (power source for this example embodiment). Display 850 is a 3.5 inch TFT LCD to allow for easier viewing and more potential functionality. In a related embodiment, a 1.3" OLED display can be used due to factors such as temperature range, cost, size, and display style. In this example embodiment, a power source module (not shown) is housed within housing 860 and includes a rechargeable battery and charging port electrically that is coupled to the rechargeable battery. The rechargeable battery is charged via a solar cell panel or via an alternating current (AC) source.

In this embodiment, a 40 kg Load Cell was used, however in the preferred embodiment a 20 kg load cell was used. The function of the load cell is to sense the strain formed by the snow load and convert it into a voltage that is read by the HX711 Load Cell Amplifier 837. Load cell amplifier 837 receives voltage outputs given from the load cell 832 and amplifies them so that Arduino microcontroller board 842 can use the outputs to convert them into a weight reading for the snow load that is placed on the blade of the shovel. The wires from the load cell are routed through the shaft 810 of the shovel and up to the electrical housing 860. Control module 840 carries out the main functions of the shovel including weight reading, displaying the weight, and triggering an alarm if the weight is too heavy. Arduino board 842 is responsible for all function of shovel 800. Board 842 takes input from the load cell amplifier 837 and through a programmed code, converts the voltage to a known weight. The Arduino Mega2560 controller board 842 will display the weight on screen 850. Board 842 includes a microcontroller 842A, along with a USB port 842B connected to a cable 842C and a power port 842D connected to a power cable 842E.

In this example embodiment, control module 840 includes a piezoelectric alarm system that is sent a voltage from Arduino board 842 when the weight load of the snow is too heavy. The alarm is programmed to sound for three seconds at a time when the weight load is exceeded. In this example embodiment, a Newark piezoelectric buzzer chosen for cost, size, voltage and sound decibel. In this example embodiment, a 1500 mAh Li-ion battery was chosen due to battery type, cost, size, voltage, amp-hours, charge time, and life. The control module on the shovel handle includes a battery level indicator, an accelerometer to measure shovel rate and weight limit adjusts to shovel rate.

In operation, shovel apparatus 800 is programmed through Arduino Integrated Development (IDE) software using very specific and requires specific libraries, mainly including UTFT library and using a HiLetgoTFT LCD Display-ILI9486 driver compatible also found with UTFT library. These libraries provide sketches with extra functionality abilities, such as the ability to display and power a screen, use a component, and other options. With respect to a calibration factor, a separate code used to calibrate load cell assembly 830 to correctly read weights. Although it is very sensitive, a user can adjust it.

The above described embodiments can be used a Fitness tracker as it includes User programmable interface, Adjustable weight limit based on: Gender, Age or Physical ability.

The following patents are incorporated by reference in their entireties: U.S. Pat. Nos. 5,135,062, 6,236,001, and 20160024733A1.

While the inventive concept has been described above in terms of specific embodiments, it is to be understood that the inventive concept is not limited to these disclosed embodiments. Upon reading the teachings of this disclosure many modifications and other embodiments of the inventive concept will come to mind of those skilled in the art to which this inventive concept pertains, and which are intended to be and are covered by both this disclosure and the appended claims. It is indeed intended that the scope of the inventive concept should be determined by proper interpretation and construction of the appended claims and their legal equivalents, as understood by those of skill in the art relying upon the disclosure in this specification and the attached drawings.

The invention claimed is:

1. A weight measuring shoveling apparatus comprising:
an elongate shaft member having a proximal end and a distal end; a broad blade plate assembly coupled to the distal end of the elongate shaft member, the broad blade assembly having a distal edge portion designed to collect a substance from a surface and a proximal connecting portion, wherein the broad blade plate assembly includes a bottom plate and a top plate disposed over the bottom plate to form a cavity therebetween;
a load cell assembly housed in the cavity between the top and bottom plates, the load cell assembly having a base coupled to the bottom plate and a pressure sensing element in contact with the top plate, wherein the load cell assembly includes an analog to digital converter and amplifier adapted to convert a weight or pressure of a material on the top plate of the broad blade assembly into an electrical signal; and
a control module disposed on the shaft member and adapted to receive the electrical signal from the load cell assembly, the control module including a microcontroller circuit, a display assembly and a power source module coupled to the microcontroller assembly and the display assembly, wherein the microcontroller assembly is adapted to generate data and display data on the display assembly, wherein the data includes weight of a substance on the broad plate assembly, calories burned by user during shoveling event, accumulated time of the shoveling event and alerts or warnings provided to user of overexertion events.

2. The apparatus in claim 1 wherein the control module is disposed within a housing that is mounted on the shaft member, the control module further including a user alarm member driven by the microcontroller circuit, wherein the user alarm member is selected from the group consisting of an audio alarm element, a haptic signal element and a LED alert element.

3. The apparatus in claim 1 wherein the display assembly includes a digital graphic user interface operatively coupled to the microcontroller circuit.

4. The apparatus in claim 1 wherein the microcontroller circuit is electrically coupled to the load cell assembly via a conductor wire disposed within the shaft member.

5. The apparatus in claim 1 wherein the microcontroller circuit includes a transceiver adapted to receive radio frequency signals from at least one of the load cell assembly and a smart device, and wherein the transceiver is adapted to send data to the smart device or an
external network.

6. The apparatus in claim 1 wherein the broad plate assembly includes a curved plate assembly where the bottom plate has a concave configuration with the distal edge portion bounded by two sidewalls and a backwall adjacent the proximal connecting portion, and
wherein the top plate has a curved plate configuration that is bounded by the two sidewalls and the backwall.

7. The apparatus in claim 1 wherein the power source module includes a rechargeable battery and charging port electrically coupled to the rechargeable battery, wherein the rechargeable battery is charged via a solar cell panel or via an alternate current source.

8. The apparatus in claim 5 wherein the smart device includes a software applet configured to use the generated data received from the microcontroller to provide health and wellness indicators.

9. The apparatus in claim 1 wherein the shaft member includes an upper and lower shaft element to facilitate a telescoping configuration that modifies the longitudinal length of the shaft to accommodate a user.

10. The apparatus in claim 1 wherein a horizontal handhold or handle is coupled to the proximal end of the shaft member.

11. A shoveling apparatus with a broad blade assembly or scoop assembly comprising:
an elongate handle member having a proximal end and a distal end;
a curved plate assembly coupled to the distal end of the elongate handle member, the curved plate assembly having a distal edge portion designed to collect a substance from a surface and a proximal connecting member;
a coupler assembly adapted to couple the curved plate assembly to the distal end of the handle member wherein the coupler assembly is adapted to allow angular orientation or movement of the curved plate assembly to be adjusted relative to the handle member;
a force transducer assembly coupled to the curved plate assembly adapted to convert a weight or pressure of a material on the curved plate assembly into an electrical signal adapted to be received by an electronic module representing an electrical scale assembly, wherein the electrical scale assembly and module disposed within the coupler assembly coupled to the handle member configured to receive electrical signals from the force transducer assembly: and a display assembly coupled to the electrical scale assembly and module.

12. The apparatus in claim 11, wherein the curved plate assembly includes a curled bucket assembly that is curled horizontally to be moved along a surface for collecting material.

13. The apparatus in claim 11 wherein the display assembly includes a digital graphic user interface.

14. The apparatus in claim 11 wherein a horizontal handhold or D-shaped handle is coupled to the proximal end of the handle member.

15. The apparatus in claim 11 wherein the force transducer assembly is protected from moisture by an electrically conducting guard circuit.

16. The apparatus in claim 11 wherein the shaft member includes an upper and a lower shaft element to facilitate a telescoping configuration that modifies the longitudinal length of the shaft member to accommodate a user.

17. The apparatus of claim 2 wherein the housing includes an LED array to provide lighting to the user.

18. The apparatus of claim 8 wherein the microcontroller is programmable to adjust weight limits for loads to be lifted by the user according to gender, age or physical ability.

19. The apparatus of claim 18 wherein the microcontroller is programmable via the smart device.

20. The apparatus of claim 1 wherein the display member selected from the group consisting of a TFT LCD and an organic LED (OLED) display.

* * * * *